UNITED STATES PATENT OFFICE.

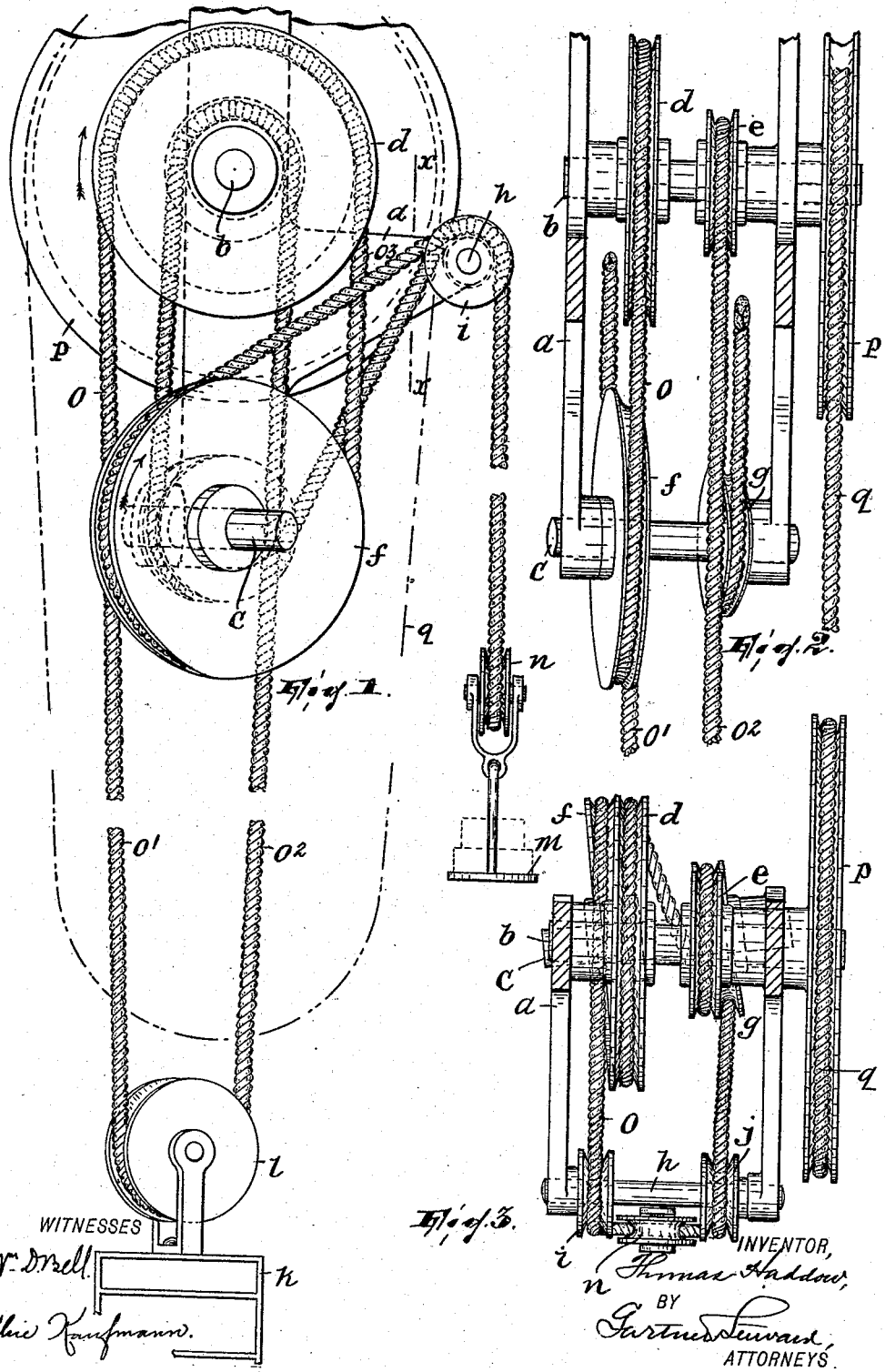

THOMAS HADDOW, OF WEST HOBOKEN, NEW JERSEY.

HOISTING APPARATUS.

No. 907,994.

Specification of Letters Patent.

Patented Dec. 29, 1908.

Application filed September 30, 1907. Serial No. 395,106.

*To all whom it may concern:*

Be it known that I, THOMAS HADDOW, a citizen of the United States, residing in West Hoboken, Hudson county, New Jersey, have invented a certain new and useful Improvement in Hoisting Apparatus; and I do hereby declare the following to be a full, clear, and exact description of the invention, such as will enable others skilled in the art to which it appertains to make and use the same, reference being had to the accompany drawings, and to letters of reference marked thereon, which form a part of this specification.

My present invention relates to hoisting apparatus, and particularly to that specific branch of this art having reference to means for operating elevators, dumb-waiters, etc., etc.

My invention has for its object so to arrange the tackle of a hoisting apparatus as to require very little space for the reception of the same, the minimum of weight to counterbalance the load, but little power to effect the vertical movements of the load, and a comparatively simple mount or supporting frame for the journaled elements of the apparatus.

My invention will be found fully illustrated in the accompanying drawing in which, Figure 1 is a side view thereof; Fig. 2 a vertical sectional view on line $x$—$x$ of Fig. 1; and, Fig. 3 a top plan view.

In the frame $a$ are journaled, one above the other, the shafts $b$ and $c$ which, as will hereinafter appear, are normally drawn toward each other by the rope, cable or chain, any of which may be used as hereinafter described; the shafts are set so that the shaft $c$ is slightly oblique to shaft $b$, for a reason also to appear. On shaft $b$ are fixed a large sheave or pulley $d$ and a small sheave or pulley $e$; on shaft $c$ are fixed a large sheave or pulley $f$ and a small sheave or pulley $g$. The large pulleys $d$ and $f$ and the small pulleys $e$ and $g$ are substantially alined vertically with each other at one side of their respective axes, although at the other sides of said axes the lower pulleys stand slightly offset with respect to the upper pulleys on account of the oblique disposition of shaft $c$, the amount of such offset being preferably approximately equal to the thickness of each pulley. In the frame $a$ is also arranged a shaft $h$ on which are journaled the pulleys $i$ and $j$.

$k$ designates the load-carrier, having the pulley $l$, and $m$ the weight having the pulley $n$.

$o$ is an endless rope, chain, cable or the like, which for brevity's sake, I hereinafter designate the "rope." Said rope extends from the pulley $l$ first over pulley $d$, then down around pulley $f$, then over pulley $i$ (clearing the portion of the rope between pulleys $d$ and $f$ owing to the oblique disposition of shaft $c$ and the position of the pulleys), then down around pulley $n$, then up over pulley $j$, then down under pulley $g$, then up over pulley $e$, and then down under pulley $l$. On either shaft $b$ or $c$, but preferably the former, is also fixed the power sheave $p$ having a convenient endless operating rope, chain or cable $q$. Pulleys $d$ and $f$ being, as shown, equal in diameter, as also pulleys $e$ and $g$, if they are rotated in the direction of the arrows (Fig. 1) pulleys $f$ and $d$ will take up the part of rope $o$ marked $o^1$ (Fig. 1) faster than the part of said rope marked $o^2$ is paid out by pulleys $e$ and $g$, which will resolve itself into the raising of load-carrier $k$; and if the pulleys are rotated in the reverse direction the load-carrier will obviously descend.

It will be obvious that the frame $a$ may be in the form of a block, being itself thus a moving part of a tackle.

Having thus fully described my invention, what I claim as new and desire to secure by Letters Patent is:

1. The combination of the load-carrier, a supporting structure, pulleys of different diameters rotatable together and journaled in said structure, other pulleys of different diameters also rotatable together and journaled in said structure, an endless rope having a running engagement with the load-carrier and extending around the larger pulleys in one direction and around the smaller pulleys in the same direction, said rope having a loop formed therein, and a weight suspended in said loop, substantially as described.

2. The combination of the load-carrier, a supporting structure, pulleys of different diameters rotatable together and journaled in said structure, other pulleys of different diameters also rotatable together and journaled in said structure, an endless rope having a running engagement with the load-carrier and extending around the larger pulleys in one direction and around the smaller pulleys in the same direction, said rope having a loop formed therein, means for maintaining a bend in the loop, and a weight suspended by the free portion of the loop, substantially as described.

In testimony, that I claim the foregoing, I have hereunto set my hand this 27th day of September 1907.

THOMAS HADDOW.

Witnesses:
  WM. D. BELL,
  JOHN W. STEWARD.